(12) United States Patent
Durandi et al.

(10) Patent No.: US 12,189,113 B2
(45) Date of Patent: Jan. 7, 2025

(54) MONITORING DEVICE, OPTICAL FILTER SYSTEM, MONITORING METHOD, AND CURRENT GENERATION DEVICE

(71) Applicant: HAMAMATSU PHOTONICS K.K., Hamamatsu (JP)

(72) Inventors: Andreas Durandi, Solothurn (CH); Helmut Teichmann, Solothurn (CH)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 799 days.

(21) Appl. No.: 17/414,462

(22) PCT Filed: Sep. 9, 2019

(86) PCT No.: PCT/JP2019/035402
§ 371 (c)(1),
(2) Date: Jun. 16, 2021

(87) PCT Pub. No.: WO2020/129328
PCT Pub. Date: Jun. 25, 2020

(65) Prior Publication Data
US 2022/0075176 A1    Mar. 10, 2022

(30) Foreign Application Priority Data
Dec. 18, 2018  (JP) .................................. 2018-236337

(51) Int. Cl.
*G02B 26/00* (2006.01)
(52) U.S. Cl.
CPC .................................. *G02B 26/001* (2013.01)
(58) Field of Classification Search
CPC ........ G02B 26/001; G02B 5/284; G02B 5/28; G01J 3/26; G01J 3/45; G09G 5/10; H04N 7/025; H04N 7/08
See application file for complete search history.

(56) References Cited

U.S. PATENT DOCUMENTS 10,746,909 B2 *  8/2020  Sano ........................ G01J 3/26
2006/0072633 A1 *  4/2006  Flanders ................. H01S 5/141
                                                        372/98

(Continued)

FOREIGN PATENT DOCUMENTS

CN        1580837 A    2/2005
CN      105683725 A    6/2016
(Continued)

OTHER PUBLICATIONS

International Preliminary Report on Patentability mailed Jul. 1, 2021 for PCT/JP2019/035402.

*Primary Examiner* — Balram T Parbadia
*Assistant Examiner* — John Curtis Sipes
(74) *Attorney, Agent, or Firm* — Faegre Drinker Biddle & Reath LLP

(57) ABSTRACT

Provided is a monitor device used with a Fabry-Perot interference filter having a pair of mirror parts and a pair of driving electrodes, and having a distance between the mirror parts changed in accordance with charges stored between the driving electrodes. The monitor device includes: a current application unit that applies an AC current having a frequency higher than a resonant frequency of the mirror parts across the driving electrodes; a voltage detection unit that detects a temporal development of a voltage generated between the driving electrodes during application of the AC current; a control unit that controls the AC current across the driving electrodes, based on an evaluation of a DC component of the voltage detected by the voltage detection unit; and a monitor unit that monitors the distance between the mirror parts based on an AC component of the voltage detected by the voltage detection unit.

13 Claims, 8 Drawing Sheets

(56) References Cited

U.S. PATENT DOCUMENTS

| | | | |
|---|---|---|---|
| 2007/0153025 A1* | 7/2007 | Mitchell | H04N 7/025 345/690 |
| 2011/0228397 A1 | 9/2011 | Matsushita | |
| 2012/0188552 A1* | 7/2012 | Hirokubo | G01J 3/51 356/450 |
| 2013/0308134 A1* | 11/2013 | Hirokubo | G02B 26/001 359/578 |
| 2015/0029590 A1* | 1/2015 | Hirokubo | G02B 26/001 359/584 |
| 2015/0092275 A1* | 4/2015 | Hirokubo | G02B 26/001 359/578 |
| 2015/0346479 A1* | 12/2015 | Hirokubo | G01J 3/26 359/578 |
| 2016/0244320 A1* | 8/2016 | Warashina | G02B 26/001 |
| 2017/0102535 A1* | 4/2017 | Matsushita | G02B 26/001 |

FOREIGN PATENT DOCUMENTS

| | | |
|---|---|---|
| CN | 105683726 A | 6/2016 |
| CN | 105992964 A | 10/2016 |
| CN | 107532941 A | 1/2018 |
| CN | 108139270 A | 6/2018 |
| JP | 2003-14641 A | 1/2003 |
| JP | 2013-238755 A | 11/2013 |
| JP | 2015-4886 A | 1/2015 |
| KR | 20030008379 A | 1/2003 |
| TW | 201837439 A | 10/2018 |

* cited by examiner

MONITORING DEVICE, OPTICAL FILTER SYSTEM, MONITORING METHOD, AND CURRENT GENERATION DEVICE

TECHNICAL FIELD

One aspect of the present disclosure relates to a monitor device, an optical filter system, a monitoring method, and a current generating device.

BACKGROUND ART

A Fabry-Perot interference filter having a pair of mirror parts facing each other with an air gap therebetween and a pair of driving electrodes facing each other with the air gap therebetween, and in which a distance between the mirror parts is changed in accordance with a potential difference between the driving electrodes is known (see Patent Literature 1, for example).

CITATION LIST

Patent Literature

Patent Literature 1: Japanese Unexamined Patent Publication No. 2015-004886

SUMMARY OF INVENTION

Technical Problem

As a method of monitoring a distance between the pair of mirror parts in the Fabry-Perot interference filter as described above, the following method can be considered. An AC current having a high frequency is applied across the driving electrodes, and an AC voltage generated between the driving electrodes is detected while the AC current is being applied. An electrostatic capacitance between the driving electrodes can be calculated based on this AC voltage, and the distance between the mirror parts can be calculated based on the electrostatic capacitance. However, electrical leakage current can occur between the driving electrodes in the Fabry-Perot interference filter in some cases, and in such a case, there is a concern that a distance between the mirror parts cannot be monitored with accuracy.

One aspect of the present disclosure has an object to provide a monitor device, an optical filter system and a monitoring method which can monitor the distance between the mirror parts of the Fabry-Perot interference filter with accuracy, and a current generating device which can be used suitably in such monitor devices.

Solution to Problem

A monitor device according to one aspect of the present disclosure is a monitor device used with a Fabry-Perot interference filter having a pair of mirror parts facing each other with an air gap therebetween and a pair of driving electrodes facing each other with the air gap therebetween, and having a distance between the pair of mirror parts changed in accordance with charges stored between the pair of driving electrodes, the monitor device comprising: a current application unit that applies an AC current having a frequency higher than a resonant frequency of the pair of mirror parts across the pair of driving electrodes; a voltage detection unit that detects a temporal development of a voltage generated between the pair of driving electrodes during application of the AC current; a control unit that controls the AC current applied by the current application unit across the pair of driving electrodes, based on an evaluation of a DC component of the voltage detected by the voltage detection unit; and a monitor unit that monitors the distance between the pair of mirror parts based on an AC component of the voltage detected by the voltage detection unit.

In this monitor device, the temporal development of the voltage generated between the pair of driving electrodes during the application of the AC current is detected, and the AC current applied across the driving electrodes is controlled based on the evaluation of the DC component of the voltage. Then, the distance between the mirror parts is monitored based on the AC component of the detected voltage. Both, the distance between the mirror parts and the leakage amount of the current between the driving electrodes, can be obtained from the AC component and the DC components of the detected voltage. Therefore, according to this monitor device, the distance between the mirror parts of the Fabry-Perot interference filter can be monitored with accuracy.

The control unit may control an AC current that the current application unit applies across the pair of driving electrodes, based on a temporal change of the DC component of the voltage detected by the voltage detection unit. In this case, the AC current applied across the driving electrodes can be suitably adjusted, and the distance between the mirror parts can be monitored with accuracy.

The control unit may also control the AC current that the current application unit applies across the pair of driving electrodes so that a level of the DC component of the voltage detected by the voltage detection unit is kept constant. In this case, the AC current applied across the driving electrodes can be adjusted further suitably, and the distance between the mirror parts can be monitored with more accuracy.

The current application unit may have a pair of current sources which applies currents in directions different from each other across the pair of driving electrodes, and generate the AC current by alternately driving the pair of current sources. In this case, the current application unit which applies the AC current across the driving electrodes can be constituted more suitably.

The control unit may change a duty ratio of a pulse-shaped current that at least either one of the pair of current sources generates, based on the evaluation of the DC component of the voltage detected by the voltage detection unit. In this case, the AC current applied across the driving electrodes can be adjusted further suitably, and the distance between the mirror parts can be monitored with more accuracy.

The control unit may change a level of the current at least either one of the pair of current sources generates, based on the evaluation of the DC component of the voltage detected by the voltage detection unit. In this case, the AC current applied across the driving electrodes can be adjusted further suitably, and the distance between the mirror parts can be monitored with more accuracy.

The current application unit further has a current source for adjustment which applies the current in the same direction as one of the pair of current sources across the pair of driving electrodes, and the control unit may control the current that the current source for adjustment generates, based on the evaluation of the DC component of the voltage detected by the voltage detection unit. In this case, the AC current applied across the driving electrodes can be adjusted further suitably, and the distance between the mirror parts can be monitored with more accuracy.

Each of the pair of current sources may include a photodiode and a light source which outputs light incident to the photodiode. In this case, the current application unit which applies the AC current across the driving electrodes can be constituted further suitably.

The current application unit further has an operational amplifier having an inverting input terminal connected to an output terminal and the pair of current sources may be connected to a non-inverting input terminal and an output terminal of the operational amplifier in parallel. In this case, the current application unit which applies the AC current across the driving electrodes can be constituted further suitably.

The control unit may control the AC current that the current application unit applies across the pair of driving electrodes, based on the DC component and the AC component detected by the voltage detection unit. In this case, the AC current applied across the driving electrodes can be adjusted further suitably, and the distance between the mirror parts can be monitored with more accuracy.

An optical filter system according to one aspect of the present disclosure comprises the above monitor device and a Fabry-Perot interference filter in which the distance between the pair of mirror parts is monitored by the monitor device. This optical filter system can monitor the distance between the mirror parts of the Fabry-Perot interference filter with accuracy due to the above reasons.

A monitoring method according to one aspect of the present disclosure is a monitoring method for monitoring a distance between a pair of mirror parts in a Fabry-Perot interference filter having the pair of mirror parts facing each other with an air gap therebetween and a pair of driving electrodes facing each other with the air gap therebetween, and having the distance between the pair of mirror parts changed in accordance with charges stored between the pair of driving electrodes, the monitoring method comprising: a voltage detection step of detecting a temporal development of a voltage generated between the pair of driving electrodes when an AC current having a frequency higher than a resonant frequency of the pair of mirror parts is applied across the pair of driving electrodes; a control step of controlling the AC current applied across the pair of driving electrodes at the voltage detection step, based on an evaluation of a DC component of the voltage detected at the voltage detection step; and a monitor step of monitoring a distance between the pair of mirror parts based on an AC component of the voltage detected at the voltage detection step.

In this monitoring method, the temporal development of the voltage generated between the pair of driving electrodes during the application of the AC current is detected, and the AC current applied across the driving electrodes is controlled based on the evaluation of the DC component of the voltage. Then, the distance between the mirror parts is monitored based on the AC component of the detected voltage. Both, the distance between the mirror parts and the leakage amount of the current between the driving electrodes, can be obtained from the AC component and the DC components of the detected voltage. Therefore, according to this monitoring method, the distance between the mirror parts of the Fabry-Perot interference filter can be monitored with accuracy.

A current generating device according to one aspect of the present disclosure comprises an operational amplifier having an inverting input terminal connected to an output terminal, a pair of photodiodes connected to a non-inverting input terminal and an output terminal of the operational amplifier in parallel in directions opposite to each other, and a pair of light sources each of which outputs light incident to the pair of photodiodes. In this current generating device, the pair of photodiodes is connected in parallel in the directions opposite to each other to the non-inverting input terminal and the output terminal of the operational amplifier having the inverting input terminal connected to the output terminal. As a result, the pair of photodiodes is brought into a zero-bias state. In this current generating device, by alternately driving the pair of light sources and by alternately driving the pair of photodiodes, the AC current can be generated. Moreover, by driving either one of the pair of light sources and by driving either one of the pair of photodiode, the DC current can be also generated. According to this current generating device, fine current control is made possible. This current generating device can be suitably used as a current application unit in the monitor device as described above.

Advantageous Effects of Invention

According to one aspect of the present disclosure, the monitor device, the optical filter system and the monitoring method which can monitor the distance between the mirror parts of the Fabry-Perot interference filter with accuracy, and the current generating device which can be used suitably in such monitor device can be provided.

DESCRIPTION OF EMBODIMENTS

Figure 1:
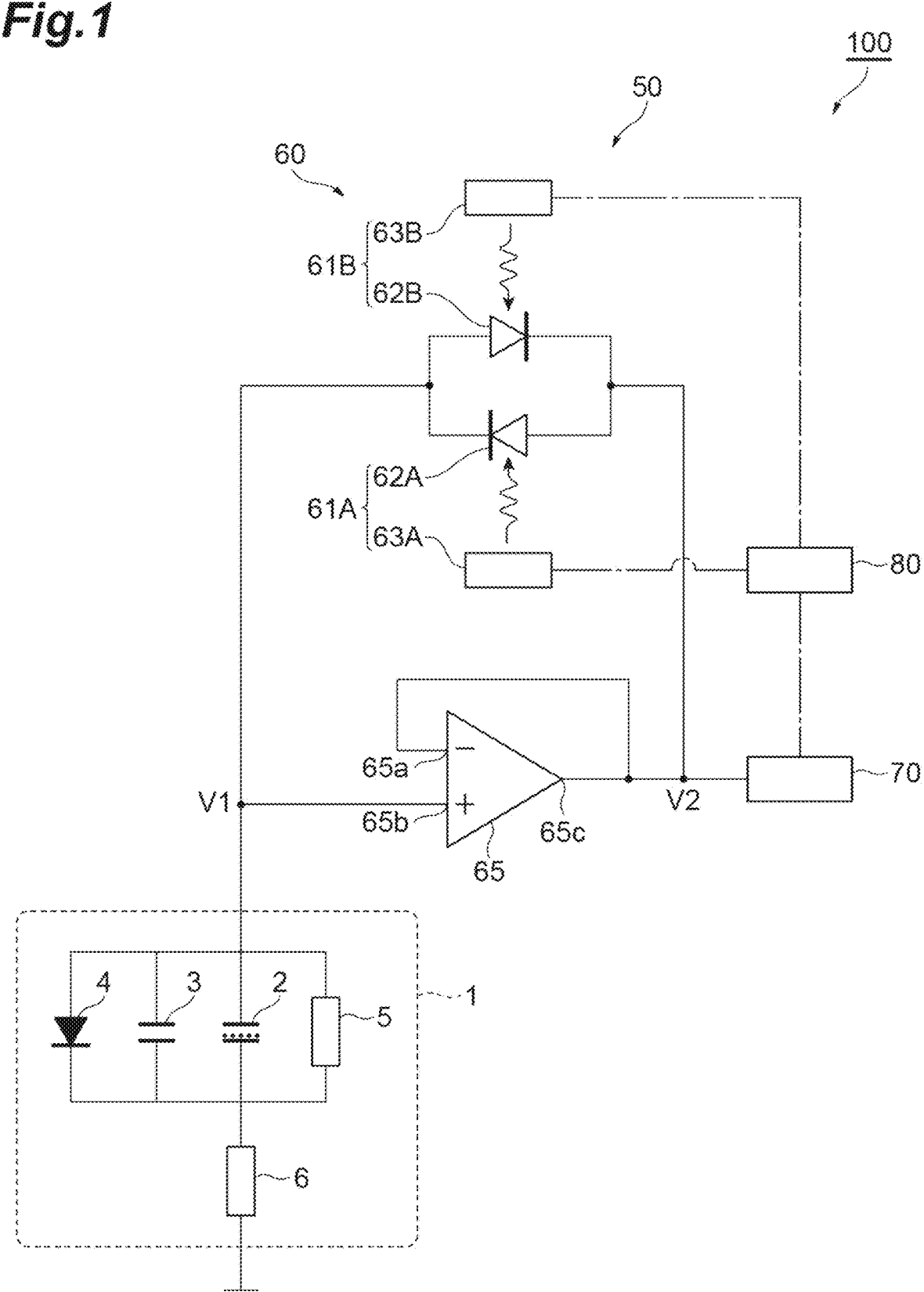
FIG. 1 is a configuration diagram of an optical filter system according to an embodiment.

In the following, an embodiment of the present disclosure will be described in detail by referring to the drawings. In the following description, the same reference numerals are used for the same or corresponding elements, and duplicated description will be omitted.

As illustrated in FIG. 1, an optical filter system 100 comprises a Fabry-Perot interference filter 1 and a controller (monitor device) 50 controlling the Fabry-Perot interference filter 1.

[Constitution of Fabry-Perot Interference Filter]

Figure 2:
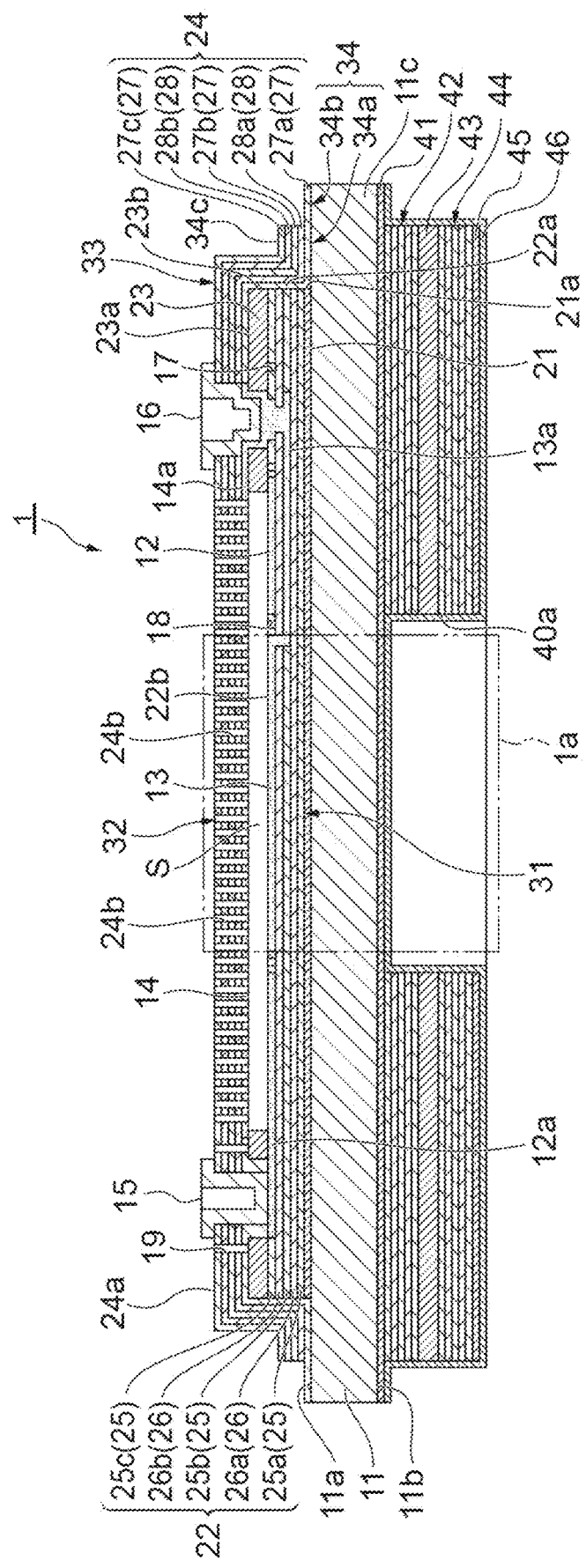
FIG. 2 is a sectional view of a Fabry-Perot interference filter.

As illustrated in FIG. 2, the Fabry-Perot interference filter 1 includes a substrate 11. The substrate 11 has a first surface 11a and a second surface 11b on a side opposite to the first surface 11a. On the first surface 11a, a reflection prevention layer 21, a first laminated body 22, an intermediate layer 23, and a second laminated body 24 are laminated in this order. Between the first laminated body 22 and the second laminated body 24, an air gap S is defined by the frame-shaped intermediate layer 23.

A shape and a positional relationship of each part when seen from a direction perpendicular to the first surface 11a (plan view) is as follows, for example. An outer edge of the substrate 11 has a rectangular shape. The outer edge of the substrate 11 and an outer edge of the second laminated body 24 are matched with each other. An outer edge of the reflection prevention layer 21, an outer edge of the first laminated body 22, and an outer edge of the intermediate layer 23 are matched with each other. The substrate 11 has an outer edge part 11c located on a side closer to an outer side than the outer edge of the intermediate layer 23 with respect to a center of the air gap. The outer edge part 11c has a framed shape and surrounds the intermediate layer 23 when seen from the direction perpendicular to the first surface 11a. The air gap S has a circular shape.

The Fabry-Perot interference filter 1 causes light having a predetermined wavelength to be transmitted in a light transmission area 1a defined on the center part. The light transmission area 1a is a columnar region, for example. The substrate 11 is formed of silicone, quartz or glass, for example. If the substrate 11 is formed of silicon, the reflection prevention layer 21 and the intermediate layer 23 are made of silicon dioxide, for example.

A portion (a portion overlapped with the air gap S on a plan view) corresponding to the light transmission area 1a in the first laminated body 22 functions as a first mirror part 31. The first mirror part 31 is a fixed mirror. The first mirror part 31 is disposed on the first surface 11a through the reflection prevention layer 21. The first laminated body 22 is constituted by alternately laminating a plurality of polysilicon layers 25 and a plurality of silicon nitride layers 26 one by one. In the Fabry-Perot interference filter 1, a polysilicon layer 25a, a silicon nitride layer 26a, a polysilicon layer 25b, a silicon nitride layer 26b, and a polysilicon layer 25c are laminated in this order on the reflection prevention layer 21. It is preferable that an optical thickness of each of the polysilicon layer 25 and the silicon nitride layer 26 constituting the first mirror part 31 is integer times of ¼ of a center transmission wavelength.

A portion (a portion overlapped with the air gap S on a plan view) corresponding to the light transmission area 1a in the second laminated body 24 functions as a second mirror part 32. The second mirror part 32 is a movable mirror. The second mirror part 32 faces the first mirror part 31 through the air gap S on a side opposite to the substrate 11 with respect to the first mirror part 31. A direction in which the first mirror part 31 and the second mirror part 32 face each other is in parallel with the direction perpendicular to the first surface 11a. The second laminated body 24 is disposed on the first surface 11a through the reflection prevention layer 21, the first laminated body 22, and the intermediate layer 23. The second laminated body 24 is constituted by alternately laminating a plurality of polysilicon layers 27 and a plurality of silicon nitride layers 28 one by one. In the Fabry-Perot interference filter 1, a polysilicon layer 27a, a silicon nitride layer 28a, a polysilicon layer 27b, a silicon nitride layer 28b, and a polysilicon layer 27c are laminated in this order on the intermediate layer 23. It is preferable that the optical thickness of each of the polysilicon layer 27 and the silicon nitride layer 28 constituting the second mirror part 32 is integer times of ¼ of the center transmission wavelength.

In a portion (a portion overlapped with the air gap S on a plan view) corresponding to the air gap S in the second laminated body 24, a plurality of through holes 24b are formed. These through holes reach the air gap S from a surface 24a on a side opposite to the intermediate layer 23 of the second laminated body 24. These through holes are formed to such a degree that does not substantially affect a function of the second mirror part 32. These through holes may be used for forming the air gap S by removing a part of the intermediate layer 23 by etching.

The second laminated body 24 further has a coating part 33 and a peripheral part 34 in addition to the second mirror part 32. The second mirror part 32, the coating part 33, and the peripheral part 34 are integrally formed to have a part of the same lamination structure as each other and to continue to each other. The coating part 33 surrounds the second mirror part 32 on a plan view. The coating part 33 covers a surface 23a on a side opposite to the substrate 11 and a side surface 23b of the intermediate layer 23, as well as a side surface 22a of the first laminated body 22, and a side surface 21a of the reflection prevention layer 21, and reaches the first surface 11a.

The peripheral part 34 surrounds the coating part 33 on a plan view. The peripheral part 34 is located on the first surface 11a in the outer edge part 11c. The outer edge of the peripheral part 34 is matched with the outer edge of the substrate 11 on a plan view. The peripheral part 34 is thinned along the outer edge of the outer edge part 11c. In this example, the peripheral part 34 is thinned by removal of a part of the polysilicon layer 27 and the silicon nitride layer 28 constituting the second laminated body 24. The peripheral part 34 has a non-thinned part 34a continuing to the coating part 33 and a thinned part 34b surrounding the non-thinned part 34a. In the thinned part 34b, the polysilicon layer 27 and the silicon nitride layer 28 are removed other than the polysilicon layer 27a provided directly on the first surface 11a.

On the first mirror part 31, a first driving electrode 12 formed by surrounding the light transmission area 1a on a plan view and a compensation electrode 13 formed by overlapping the light transmission area 1a on a plan view are provided. That is, in this example, the first driving electrode 12 and the compensation electrode 13 constitute the first mirror part 31 (the first mirror part 31, the first driving electrode 12, and the compensation electrode 13 are formed integrally each other). A size of the compensation electrode 13 is a size including the entire light transmission area 1a but may be substantially the same as the size of the light transmission area 1a. The first driving electrode 12 and the compensation electrode 13 are formed by lowering resistance of the polysilicon layer 25c by doping impurities. On the second mirror part 32, a second driving electrode 14 facing the first driving electrode 12 and the compensation electrode 13 is formed through the air gap S. That is, in this example, the second driving electrode 14 constitutes the second mirror part 32 (the second 32 and the second driving electrode 14 are formed integrally each other). The second driving electrode 14 is formed by lowering resistance of the polysilicon layer 27a by doping impurities.

The Fabry-Perot interference filter 1 further comprises a pair of terminals 15 and a pair of terminals 16. The pair of terminals 15 is provided by facing each other while sandwiching the light transmission area 1a. Each of the terminals 15 is disposed in the through hole from the surface 24a of the second laminated body 24 to the first laminated body 22. Each of the terminals 15 is electrically connected to the first driving electrode 12 through a wiring 12a. The terminal 15 is formed by a metal film of aluminum or an alloy thereof, for example.

The pair of terminals 16 is provided by facing each other while sandwiching the light transmission area 1a. Each of the terminals 16 is disposed in the through hole from the surface 24a of the second laminated body 24 to the first laminated body 22. Each of the terminals 16 is electrically connected to the compensation electrode 13 through a wiring 13a and is electrically connected to the second driving electrode 14 through a wiring 14a. The terminal 16 is formed of a metal film of aluminum or an alloy thereof, for example. The direction in which the pair of terminals 15 face each other is orthogonal to the direction in which the pair of terminals 16 face each other.

On a surface 22b of the first laminated body 22, trenches 17 and 18 are provided. The trench 17 extends annularly by surrounding a connection portion with the terminal 16 in the wiring 13a. The trench 17 electrically insulates the first driving electrode 12 and the wiring 13a. The trench 18 extends annularly along an inner edge of the first driving electrode 12. The trench 18 electrically insulates the first driving electrode 12 and an area (the compensation electrode 13) on an inner side of the first driving electrode 12. An area in each of the trenches 17 and 18 may be an insulating material or an air gap. On the surface 24a of the second laminated body 24, a trench 19 is provided. The trench 19 extends annularly by surrounding the terminal 15. The trench 19 electrically insulates the terminal 15 and the second driving electrode 14. An area in the trenches 17 and 18 may be an insulating material or may be an air gap.

On the second surface 11b of the substrate 11, a reflection prevention layer 41, a third laminated body 42, an intermediate layer 43, and a fourth laminated body 44 are laminated in this order. The reflection prevention layer 41 and the intermediate layer 43 have constitution similar to that of the reflection prevention layer 21 and the intermediate layer 23. The third laminated body 42 and the fourth laminated body 44 have a lamination structure symmetric to the first laminated body 22 and the second laminated body 24 based on the substrate 11, respectively. The reflection prevention layer 41, the third laminated body 42, the intermediate layer 43, and the fourth laminated body 44 have a function of suppressing warping of the substrate 11.

In the third laminated body 42, the intermediate layer 43, and the fourth laminated body 44, an opening 40a is provided to overlap the light transmission area 1a on a plan view. The opening 40a has a diameter substantially the same as the size of the light transmission area 1a. The opening 40a is opened on a light outgoing side. A bottom surface of the opening 40a reaches the reflection prevention layer 41.

On a surface on the light outgoing side of the fourth laminated body 44, a light shielding layer 45 is formed. The light shielding layer 45 is made of a metal film of aluminum or an alloy thereof, for example. On the surface of the light shielding layer 45 and on an inner surface of the opening 40a, a protective layer 46 is formed. The protective layer 46 covers outer edges of the third laminated body 42, the intermediate layer 43, the fourth laminated body 44, and the light shielding layer 45 and covers the reflection prevention layer 41 on the outer edge part 11c. The protective layer 46 is made of aluminum oxide, for example.

[Constitution of Controller]

As illustrated in FIG. 1, the controller 50 includes a current application unit (a current generating device) 60, a voltage detection unit 70, and a control unit (a monitor unit) 80. In FIG. 1, the Fabry-Perot interference filter 1 is illustrated as an equivalent circuit. The Fabry-Perot interference filter 1 as the equivalent circuit can be expressed by a variable capacitor 2; a fixed capacitor 3, a diode 4, and a parallel resistor 5 connected in parallel with the variable capacitor 2, and a serial resistor 6 connected in series with the variable capacitor 2. The variable capacitor 2 corresponds to the electrostatic capacitance accumulated between the first mirror part 31 and the second mirror part 32. The fixed capacitor 3 corresponds to parasitic capacitance of the Fabry-Perot interference filter 1.

The current application unit 60 has a pair of current sources 61A and 61B and an operational amplifier 65. The current source 61A has a photodiode 62A and a light source 63A, and the current source 61B has a photodiode 62B and a light source 63B. The photodiodes 62A and 62B are connected in parallel in directions opposite to each other. That is, an anode of the photodiode 62A is connected to a cathode of the photodiode 62B, and a cathode of the photodiode 62A is connected to an anode of the photodiode 62B. The light source 63A outputs light incident to the photodiode 62A, and the light source 63B outputs light incident to the photodiode 62B. The photodiodes 62A and 62B are configured to be low capacity.

The photodiodes 62A and 62B are in the zero-bias state as will be described later. The photodiodes 62A and 62B generate electric currents from the anode to the cathode if light from the light sources 63A and 63B are incident, respectively. A direction of the current that the photodiode 62A generates is opposite to the direction of the current that the photodiode 62B generates.

The operational amplifier 65 has an inverting input terminal 65a, a non-inverting input terminal 65b, and an output terminal 65c. The inverting input terminal 65a is connected to the output terminal 65c, and the pair of current sources 61A and 61B are connected in parallel with the non-inverting input terminal 65b and the output terminal 65c. As a result, a closed circuit is constituted, a voltage V1 on the non-inverting input terminal 65b side and a voltage V2 on the output terminal 65c side are kept equal to each other, and the pair of current sources 61A and 61B is in the zero-bias state. A forward gain of the operational amplifier 65 is 1, for example, and the operational amplifier 65 has a high input resistance, a high driving voltage range (approximately ±70 V, for example), and a high slew rate (approximately 20 V/μs, for example).

The current application unit 60 is connected to the Fabry-Perot interference filter 1 and functions as a current generating device which generates a current applied across the first mirror part 31 and the second mirror part 32. More specifically, the current application unit 60 is connected to the Fabry-Perot interference filter 1 so that the non-inverting input terminal 65b and the Fabry-Perot interference filter 1 have the same potential. In the current application unit 60, by driving either one of the light sources 63A, 63B and by driving either one of the photodiodes 62A, 62B, a DC current can be applied to the Fabry-Perot interference filter 1. Moreover, by alternately driving the light sources 63A, 63B and by alternately driving the photodiodes 62A, 62B, an AC current can be also applied to the Fabry-Perot interference filter 1. All currents generated by the current application unit 60 will flow into the Fabry-Perot interference filter 1.

The voltage detection unit 70 is a fast voltmeter, for example. The voltage detection unit 70 is connected to the current application unit 60 so as to have the same potential as the output terminal 65c and detects the voltage V2. The control unit 80 is constituted by a computer including a processor (CPU), a RAM and a ROM which are recording mediums, for example. The control unit 80 controls an operation of the current application unit 60. More specifically, the control unit 80 controls operations of the light sources 63A and 63B and hence, controls operations of the photodiodes 62A and 62B. The control unit 80 also functions as a monitor unit which monitors a distance between the first mirror part 31 and the second mirror part 32 based on a detection result of the voltage detection unit 70, in particular based on the temporal development of the AC component and DC component of the voltage detected by the voltage detection unit 70 as described below.

[Driving Method of Fabry-Perot Interference Filter]

When the Fabry-Perot interference filter 1 is driven, the current application unit 60 applies a DC current (driving current) across the first driving electrode 12 and the second driving electrode 14 (that is, across the first mirror part 31 and the second mirror part 32) through the terminals 15 and 16. For example, when the light source 63A is driven, and the photodiode 62A is driven, the resulting DC current is applied across the first driving electrode 12 and the second driving electrode 14. As a result, charges are stored between the first driving electrode 12 and the second driving electrode 14, and an electrostatic force corresponding to the charges is generated between the first driving electrode 12 and the second driving electrode 14. By means of the electrostatic force, the second mirror part 32 is attracted to the first mirror part 31 side fixed to the substrate 11, and a distance between the first mirror part 31 and the second mirror part 32 (hereinafter also described as an "inter-mirror distance") is adjusted against the spring forces acting on the mirror parts. As described above, in the Fabry-Perot interference filter 1, the inter-mirror distance is changed in accordance with the charges stored between the first mirror part 31 and the second mirror part 32 (that is, between the first driving electrode 12 and the second driving electrode 14). The first mirror part 31 and the second mirror part 32 are movable and spring loaded.

A wavelength of the light transmitted through the Fabry-Perot interference filter 1 depends on the inter-mirror distance in the light transmission area 1a. Therefore, by adjusting the driving current applied across the first driving electrode 12 and the second driving electrode 14, the wavelength of the transmitted light can be selected as appropriate. The compensation electrode 13 has the same potential as the second driving electrode 14. Therefore, the compensation electrode 13 functions so that the first mirror part 32 and the second mirror part 31 are kept flat in the light transmission area 1a.

In the Fabry-Perot interference filter 1, for example, by detecting the light transmitted through the light transmission area 1a of the Fabry-Perot interference filter 1 by a photodetector while the driving current applied across the first driving electrode 12 and the second driving electrode 14 is changed (that is, while the inter-mirror distance is changed), an optical spectrum can be obtained.

The control unit 80 controls the driving current applied to across the first mirror part 31 and the second mirror part 32 based on the charges accumulated between the first mirror part 31 and the second mirror part 32, for example. The control unit 80 controls the driving current with a charge amount as a target amount, for example. The target amount is set in accordance with a target value of the inter-mirror distance. As a result, the inter-mirror distance is adjusted to a desired distance. In other words, the inter-mirror distance is set according to the charges accumulated between the first mirror part 31 and the second mirror part 32.

Figure 3:
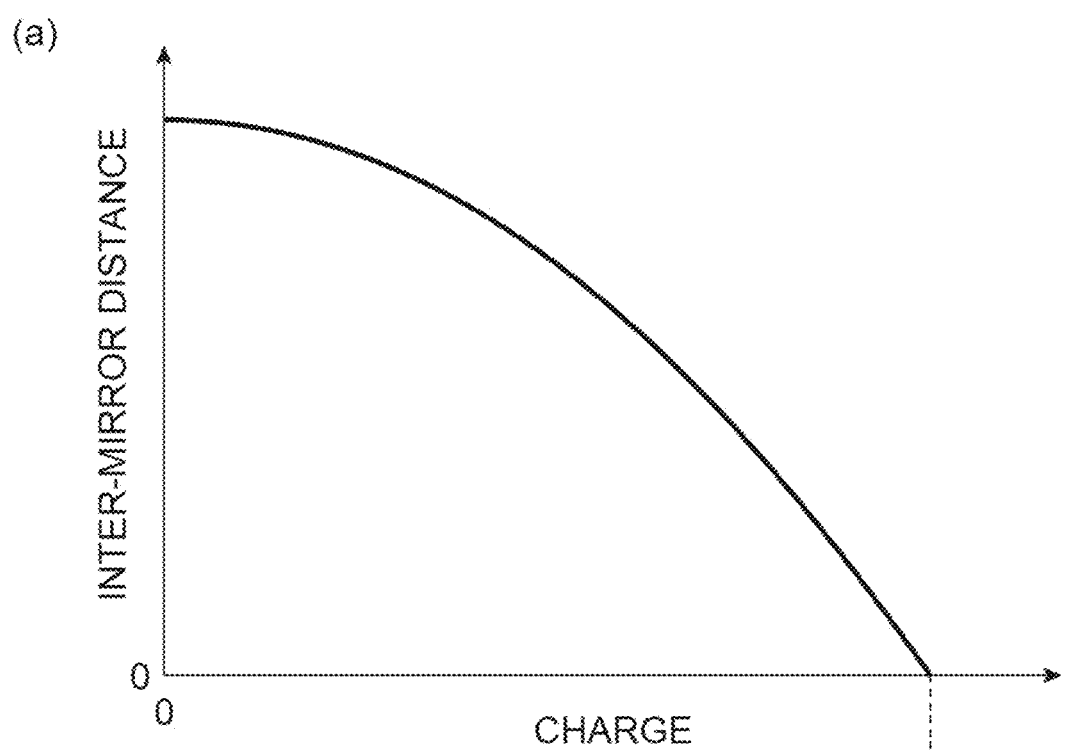
FIG. 3($a$) is a graph showing an example of a relationship between electric charges accumulated between a first mirror part and a second mirror part and a distance between the first mirror part and the second mirror part, and FIG. 3($b$) is a graph showing an example of the relationship between the electric charges accumulated in the first mirror part and the second mirror part and a voltage between the first mirror part and the second mirror part.
Figure 3:
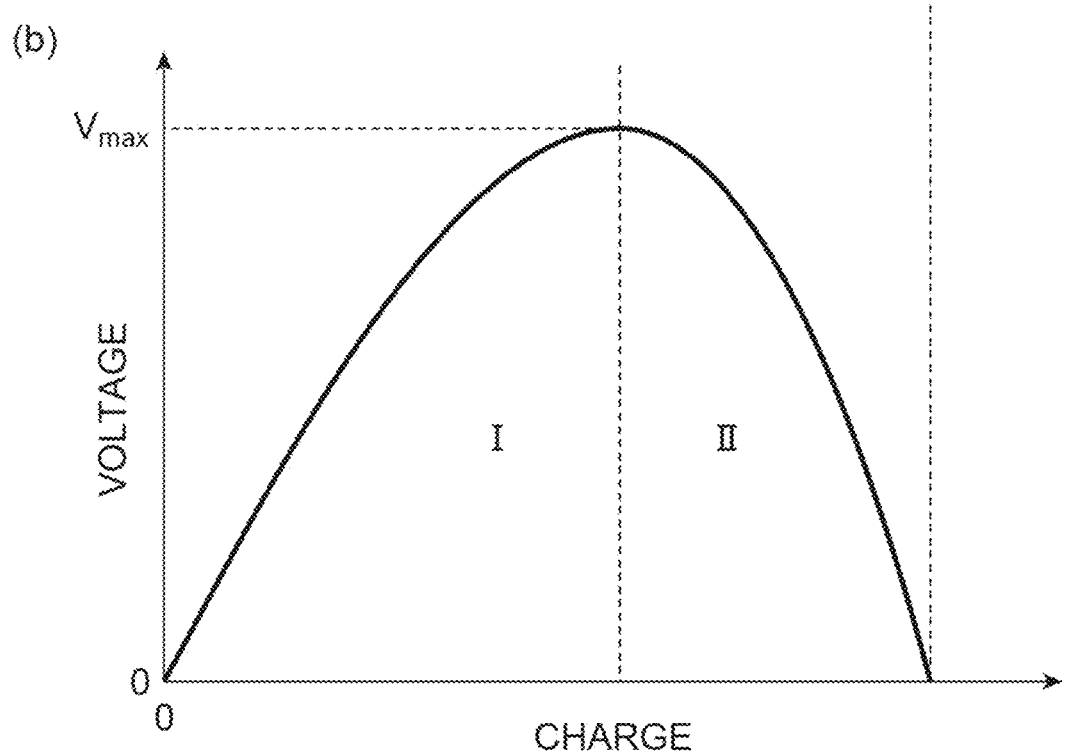

FIG. 3(a) is a graph showing an example of a relationship between charges accumulated between the first mirror part 31 and the second mirror part 32 (that is, between the first driving electrode 12 and the second driving electrode 14) and the inter-mirror distance, and FIG. 3(b) is a graph showing an example of a relationship between the charges accumulated between the first mirror part 31 and the second mirror part 32 and the voltage between the first mirror part 31 and the second mirror part 32 (that is, between the first driving electrode 12 and the second driving electrode 14). Regions I and II in FIG. 3(b) denote the operation regions of the Fabry-Perot interference filter 1. The accumulated charge amount leads to voltage maximum over the variable capacitor 2. In the driving method of the Fabry-Perot interference filter 1 in this embodiment, control based on the charge is used and thus, the inter-mirror distance can be changed in a wide range.

That is, if the inter-mirror distance is to be adjusted by an applied voltage applied across the first mirror part 31 and the second mirror part 32, for example, a range which can change the applied voltage is only an area on the left side to a maximum value Vmax in the graph illustrated in FIG. 3(b). Thus, the inter-mirror distance can be changed only in a narrow range. Moreover, in case that the applied voltage becomes only slightly larger than the maximum value Vmax, there is a concern that a pull-in phenomenon occurs. In this case, the variable capacitor 2 cannot follow to higher voltage according to FIG. 3(b). Accordingly, while the second mirror part 32 is pulled toward the first mirror part 31 due to the pull-in phenomenon, the fixed capacitor is further charged up with charges without any stop, as the applied control voltage and the variable capacitors voltage cannot get into an equilibrium state, as the variable capacitor's voltage range is limited by the maximum Vmax shown in FIG. 3(b). During the pull-in phenomenon, the variable capacitor is charged up and the first mirror part 31 and the second mirror part 32 exert increasingly attracting forces to each other, that cannot be compensated by the mechanical spring and the first mirror part 31 and the second mirror part 32 are mechanically brought into firm contact with each other and thus, there is a concern that damage is caused to the Fabry-Perot interference filter 1. On the other hand, according to the driving method of the Fabry-Perot interference filter 1 in this embodiment, since the control based on the charge amount is used, there is no restriction as described above, the pull-in phenomenon can be avoided and the inter-mirror distance can be changed in a much wider range. Moreover, the device operation reliability can be improved.

[Monitoring Method of Inter-Mirror Distance]

Subsequently, a monitoring method of the inter-mirror distance performed in the Fabry-Perot interference filter 1 will be described. The monitoring method is performed in a state where the inter-mirror distance is adjusted to a predetermined distance, for example.

The current application unit 60 applies an AC current having a frequency higher than the resonant frequency of the first mirror part 31 and the second mirror part 32 across the first driving electrode 12 and the second driving electrode 14 (that is, across the first mirror part 31 and the second mirror part 32) through the terminals 15 and 16 (current application step). For example, when the light sources 63A and 63B are alternately driven, and the photodiodes 62A and 62B are alternately driven, the AC current is applied across the first driving electrode 12 and the second driving electrode 14.

Figure 4:
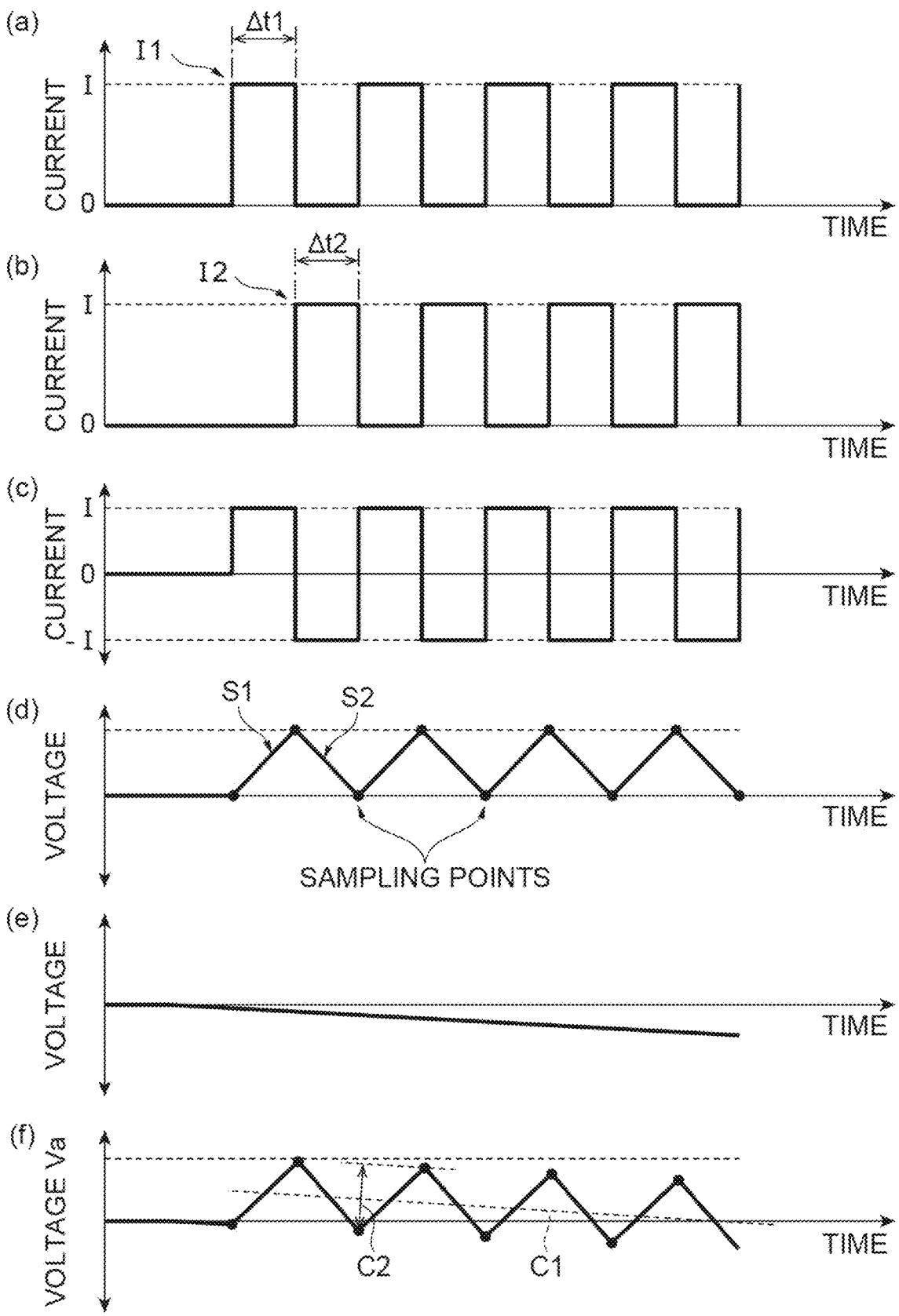
FIGS. 4($a$) to 4($f$) are graphs for explaining a monitoring method of the embodiment.

More specifically, as illustrated in FIGS. 4(a) and 4(b), for example, the photodiodes 62A and 62B (light sources 63A and 63B) are controlled so that the pulse-shaped current is alternately generated. A pulse width of the current is approximately 1 μs, for example. By adding up these pulse-shaped currents, as illustrated in FIG. 4(c), the AC current is applied across the first mirror part 31 and the second mirror part 32. As a result, as illustrated in FIG. 4(d), a voltage is considered to be generated between the first mirror part 31 and the second mirror part 32. Measuring the voltage values at the times of switching currents, slopes S1 and S2 can be defined as $$S1=\Delta Va/(I1*\Delta t1)$$

and $$S2=\Delta Va/(I2*\Delta t2).$$

These slopes S1 and S2 are inverse proportional to the total capacitance of the Fabry-Perot Interference filter 1.

Here, in the Fabry-Perot interference filter 1, leakage of the current can occur between the first mirror part 31 and the second mirror part 32 in some cases. When there is a leak current, the DC component of the voltage between the first mirror part 31 and the second mirror part 32 gradually decreases by a predetermined amount with lapse of time as in the case illustrated in FIG. 4(e), for example, if the Fabry-Perot interference filter 1 operates in the region I shown in FIG. 3(b). Thus, if there is no leak current, a voltage as illustrated in FIG. 4(d) is considered to be generated between the first mirror part 31 and the second mirror part 32, but if there is a leak current, the DC component of the voltage between the first mirror part 31 and the second mirror part 32 gradually decreases as illustrated in FIG. 4(f). The case of negligible leak current corresponds to a case where the parallel resistor 5 in the above equivalent circuit can be regarded to be sufficiently large, while the case with non-negligible leak current corresponds to a case where the parallel resistor 5 cannot be considered to be sufficiently large. If the Fabry-Perot interference filter 1 would be in the region II in FIG. 3(b), the DC component of the voltage between the first mirror part 31 and the second mirror part 32 would gradually increase by a predetermined amount with lapse of time.

A voltage Va illustrated in FIG. 4(f) is detected by the voltage detection unit 70 (voltage detection step). More specifically, the voltage Va is a voltage generated between the first mirror part 31 and the second mirror part 32 during application of the AC current, and the voltage detection unit 70 detects a DC component C1 and an AC component C2 of the voltage Va. The AC component C2 is a component periodically changed in the voltage Va, and the DC component C1 is a component (average value) excluding the AC component C2 in the voltage Va. If the leakage current is non-negligible, the waveform of the AC component C2 does not change, while a level of the DC component C1 gradually decreases by a predetermined amount (with constant inclination) in accordance with the lapse of time.

The curve shown in FIG. 4(f) contains even more information which can be extracted. If the voltage detection unit 70 records each sampling point shown in FIG. 4(f) and the corresponding current values I1 and I2, and the durations Δt1 and Δt2. Then the slopes S1 and S2 can be defined as $$S1=\Delta Va/(I1*\Delta t1)$$

and $$S2=\Delta Va/(I2*\Delta t2).$$

In the presence of negligible leakage current, these two slopes S1 and S2 are of opposite sign, but same absolute value. The absolute value can be related to the inverse of the total capacitance of the Fabry-Perot intereference filter 1. In case of non-negligible leakage current, the absolute values of the two slopes S1 and S2 are deviating from each other due to the fact that the leakage current reduces charging up the capacitance but accelerates de-charging of the capacitance of the Fabry-Perot interference filter 1. The leakage current can be determined if both values of the slopes S1 and S2 have been measured. Thus both, the inter-mirror distance and the leakage current between the first mirror part 31 and the second mirror part 32, can be obtained from this temporal development of the AC and the DC voltage components. By adjusting the AC current applied across the first mirror part 31 and the second mirror part 32 and by using the DC component of the AC current to compensate the leakage current, the distance between the first mirror part 31 and the second mirror part 32 can be monitored with accuracy.

Figure 5:
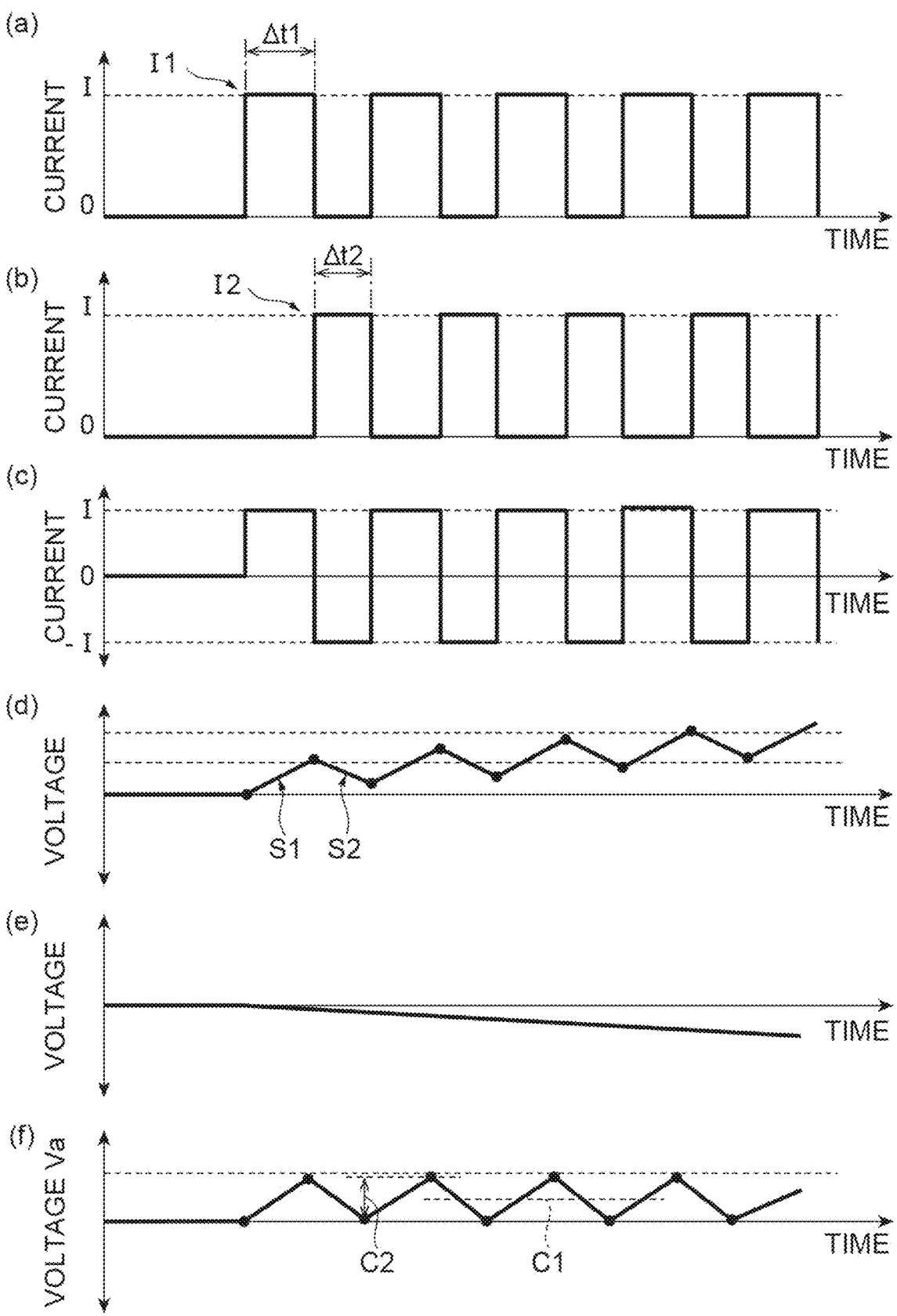
FIGS. 5($a$) to 5($f$) are graphs for explaining the monitoring method of the embodiment.

The control unit 80 controls the AC current that the current application unit 60 applies across the first mirror part 31 and the second mirror part 32, based on the temporal development of the AC component and DC component of the voltage detected by the voltage detection unit 70 (control step). For example, the control unit 80 changes a duty ratio of the pulse-shaped current that the photodiode 62A generates. In this example, the control unit 80 increases the pulse width of the pulse-shaped current as illustrated in FIG. 5(a). As a result, a voltage as illustrated in FIG. 5(d) (example for region I in FIG. 3(b)) is generated between the first mirror part 31 and the second mirror part 32. As a result, the influence of the leak current is cancelled, and the level of the DC component C1 of the voltage Va is kept constant, as illustrated in FIG. 5(f). An increased pulse width is determined so that the level of the DC component C1 is kept constant, based on the evaluation of the temporal change (inclination) of the AC component and DC component of the voltage detected by the voltage detection unit 70 (as described, by the means of slopes S1 and S2), for example. That is, in this example, the control unit 80 controls the AC current that the current application unit 60 applies across the first mirror part 31 and the second mirror part 32 based on the temporal change of the AC component and DC components the voltage detected by the voltage detection unit 70 in a manner that the level of the DC component C1 detected by the voltage detection unit 70 is kept constant.

The control unit 80 monitors the inter-mirror distance based on the temporal development of the AC component and DC component of the voltage detected by the voltage detection unit 70 (monitor step). More specifically, for example, the control unit 80 calculates the electrostatic capacitance between the first mirror part 31 and the second mirror part 32 based on the temporal development of the AC component and DC component of the voltage, respectively based on the slope values S1 and S2. The inverse of the electrostatic capacitance and the leakage current can be calculated based on these slope values S1 and S2, the AC current applied across the first mirror part 31 and the second mirror part 32 at the current application step and frequencies of the AC component C2 and the AC current. More specifically, expressing the AC component as V(t) and the AC current as I(t), complex impedance Z(ω) as a function of an angular frequency ω is obtained by Z(ω)=V(ω)/I(ω), and the electrostatic capacitance C is obtained by $C=(\omega\times|Z(\omega)|)^{-1}$. Moreover, in general, the electrostatic capacitance C of the variable capacitor (2) is a value in proportion with 1/d as expressed as $$C=\omega\times A/d$$

($\omega$ is a dielectric constant, A is a surface area of a flat plate forming the capacitor, and d is a distance between the flat plates). From this relationship, the control unit 80 calculates the inter-mirror distance based on the obtained electrostatic capacitance. The inter-mirror distance may be calculated considering the effect of the parasitic capacitance (the fixed capacitor 3) if necessary.

[Function and Effect]

In the monitor device (the controller 50) described above, the DC component C1 and the AC component C2 of the voltage Va generated between the first mirror part 31 and the second mirror part 32 are detected by sampling over time during the application of the AC current, additionally slopes S1 and S2 are calculated, the total capacitance and the leakage current are calculated and the AC current applied across the first mirror part 31 and the second mirror part 32 is controlled based on the evaluated parameters mentioned above in a way that the inter-mirror distance and the DC voltage component C1 remain constant. Then, also the detected AC component C2 is kept constant and the inter-mirror distance can be monitored with high accuracy. Since the DC component C1 includes information relating to the leak amount (insulation between the first mirror part 31 and the second mirror part 32) of the current between the first mirror part 31 and the second mirror part 32, by adjusting the DC component of the AC current applied across the first mirror part 31 and the second mirror part 32 by using the DC component C1, the inter-mirror distance can be controlled and monitored with accuracy. Therefore, according to this monitor device, the inter-mirror distance of the Fabry-Perot interference filter 1 can be monitored with accuracy.

In the monitor device, based on the temporal change of the DC component C1 detected by the voltage detection unit 70, the AC current that the current application unit 60 applies across the first mirror part 31 and the second mirror part 32 is controlled. As a result, the AC current applied across the first mirror part 31 and the second mirror part 32 can be adjusted more suitably, and the inter-mirror distance can be monitored with more accuracy.

In the monitor device, the AC current that the current application unit 60 applies across the first mirror part 31 and the second mirror part 32 is controlled so that the level of the DC component C1 detected by the voltage detection unit 70 is kept constant. As a result, the AC current applied across the first mirror part 31 and the second mirror part 32 can be adjusted further suitably, and the inter-mirror distance can be monitored with more accuracy.

In the monitor device, the current application unit 60 has the pair of current sources 61A and 61B which apply the currents in the directions different from each other across the first mirror part 31 and the second mirror part 32 and generates the AC current by alternately driving the pair of current sources 61A and 61B. As a result, the current application unit 60 for applying the AC current across the first mirror part 31 and the second mirror part 32 can be constituted more suitably.

In the monitor device, based on the DC component C1 detected by the voltage detection unit 70, the duty ratio of the pulse-shaped current that the current source 61A generates is changed. As a result, the AC current applied across the first mirror part 31 and the second mirror part 32 can be adjusted further suitably, and the inter-mirror distance can be monitored more accuracy. That is, since the control of the duty ratio is based on time, highly accurate control can be realized.

In the monitor device, the current source 61A includes the photodiode 62A and the light source 63A, and the current source 61B includes the photodiode 62B and the light source 63B. As a result, the current application unit 60 for applying the AC current across the first mirror part 31 and the second mirror part 32 can be constituted further suitably. That is, by constituting the current sources 61A and 61B as above, fine current control is made possible.

In the monitor device, the current application unit 60 has the operational amplifier 65 having the inverting input terminal 65a connected to the output terminal 65c and the pair of current sources 61A and 61B are connected in parallel with the non-inverting input terminal 65b and the output terminal 65c of the operational amplifier 65. As a result, the current application unit 60 for applying the AC current across the first mirror part 31 and the second mirror part 32 can be constituted further suitably.

[Variation]

Figure 6:
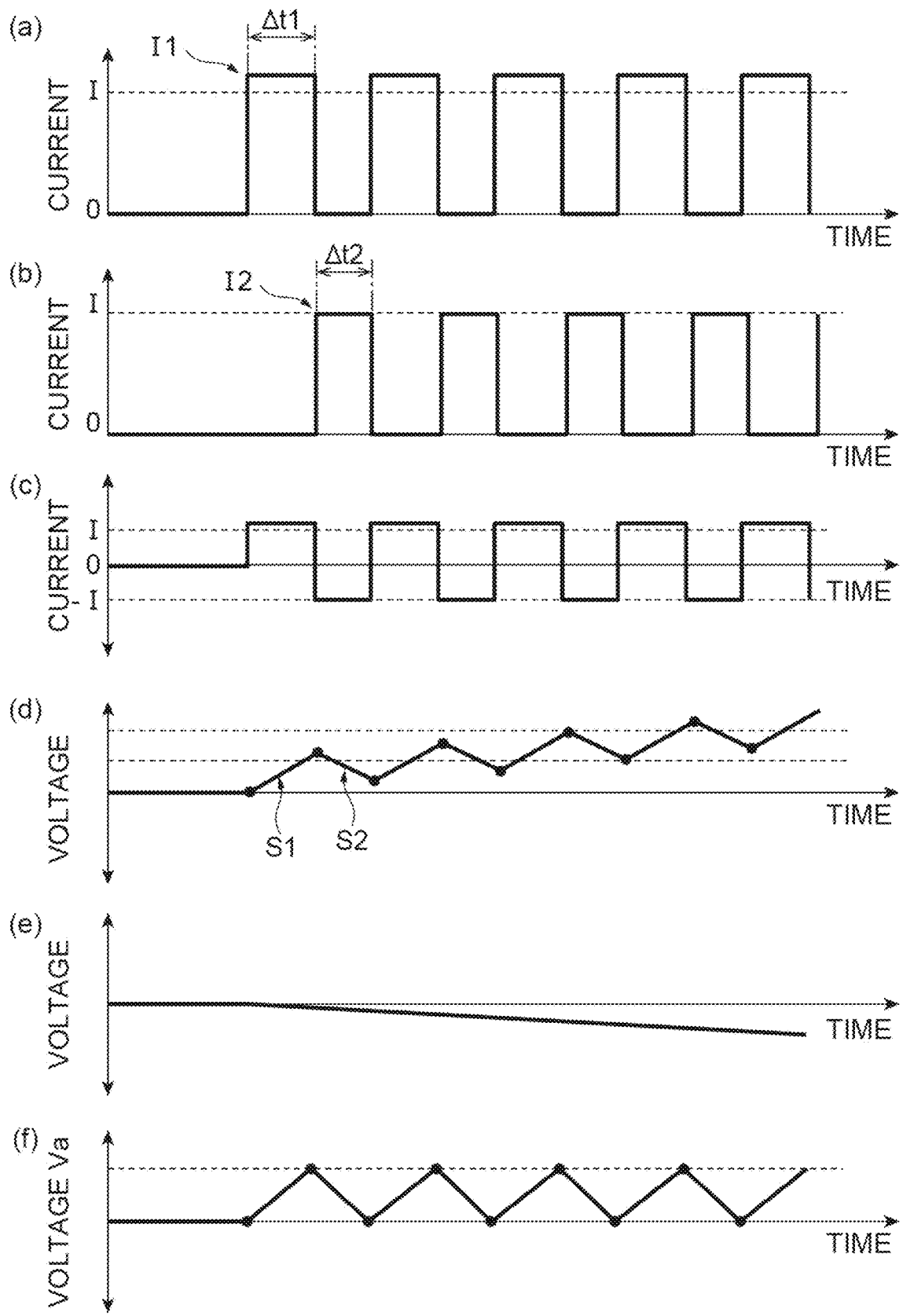
FIGS. 6($a$) to 6($f$) are graphs for explaining the monitoring method of a first variation.

The present disclosure is not limited to the above embodiment. For example, control as in a first variation illustrated in FIGS. 6(*a*) to 6(*f*) may be employed. In the first variation, the control unit 80 changes the duty ratio of the pulse-shaped current that the current source 61A generates and changes the level of the current that the current source 61A generates, based on the temporal development of the AC component and DC component of the voltage detected by the voltage detection unit 70. In this example, the level of the current that the current source 61A generates is larger than the case of the above embodiment. By means of such first variation, too, similarly to the above embodiment, the inter-mirror distance of the Fabry-Perot interference filter 1 can be controlled with accuracy by charging or un-charging the driving electrodes of the mirror parts according to the DC component of the applied AC current over time. Moreover, the AC current applied across the first mirror part 31 and the second mirror part 32 can be adjusted further suitably, and the inter-mirror distance can be controlled with more accuracy. For example, in the above embodiment, amplitude of the voltage Va is smaller than 1, while in the first variation, adjustment can be made so that the amplitude of the voltage Va becomes 1. That is, according to the first variation, the amplitude of the voltage Va can be adjusted to a desired value. The duty ratio of the pulse-shaped current that the current source 61A generates cannot be changed, and only the level of the current that the current source 61A generates may be changed. The level of the current that at least either one of the current sources 61A and 61B generates only needs to be changed, and the level of the current that both the current sources 61A and 61B generate may be changed, for example. In the above embodiment and the first variation, the duty ratio of the pulse-state current that at least either one of the current sources 61A and 61B generates only needs to be changed, and the duty ratio of the pulse-shaped current that both the current sources 61A and 61B generate may be changed, for example.

Figure 7:
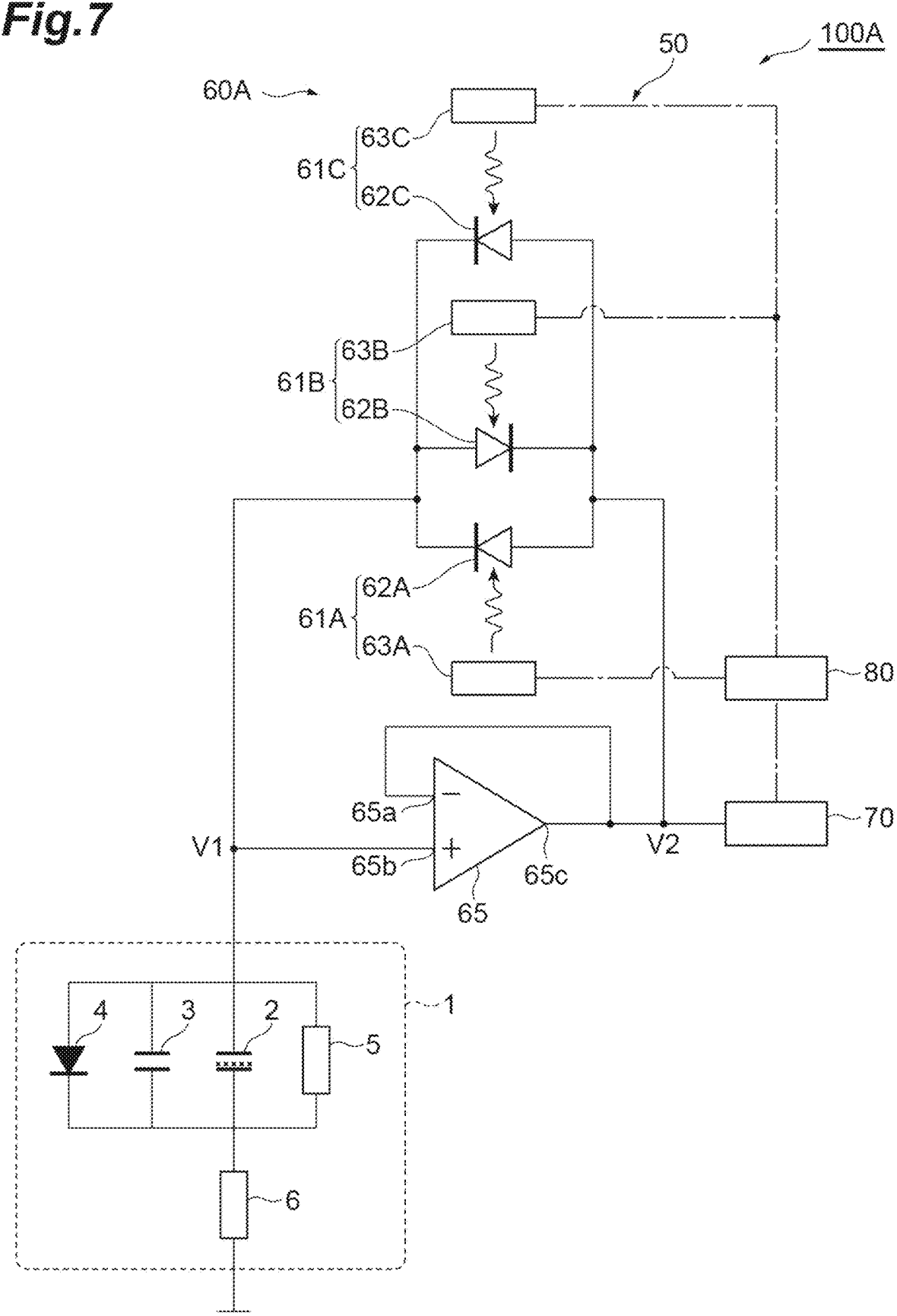
FIG. 7 is a configuration diagram of the optical filter system according to a second variation.
Figure 8:
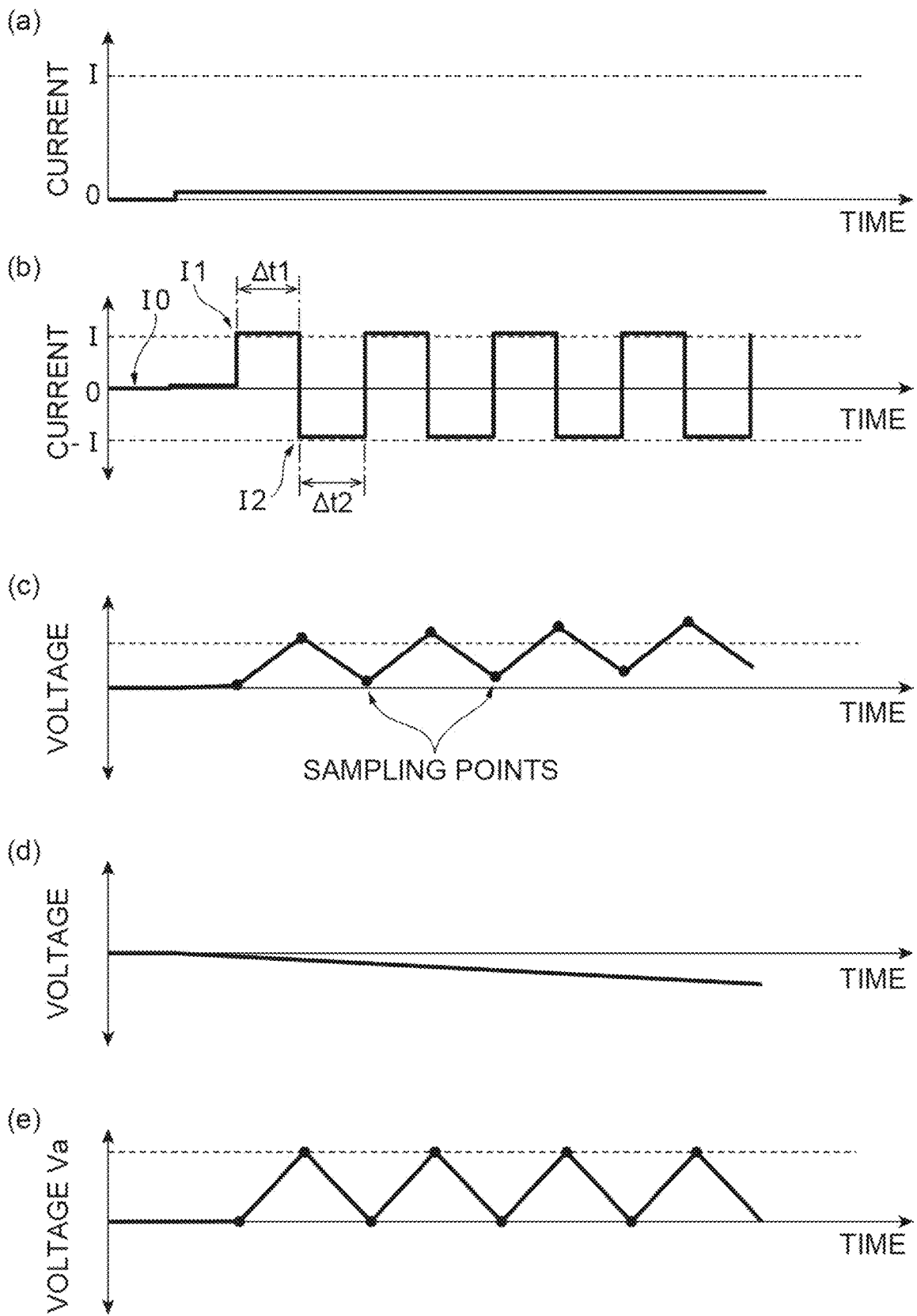
FIGS. 8($a$) to 8($e$) are graphs for explaining the monitoring method of a second variation.

The optical filter system 100 may be constituted as an optical filter system 100A of a second variation illustrated in FIG. 7. A current application unit 60A of the optical filter system 100A has a current source 61C (a current source for adjustment) which applies a current in the same direction as the current source 61A across the first mirror part 31 and the second mirror part 32. In the second variation, the control unit 80 controls the current that the current source 61C generates based on the temporal development of AC component and DC component of the voltage detected by the voltage detection unit 70. For example, the control unit 80 causes a certain current I0 to be generated by the current source 61C as illustrated in FIG. 8(a). The current sources 61A and 61B alternately generate the pulse-shaped currents having an equal width to each other as illustrated in FIGS. 4(a) and 4(b). By adding up these currents, as illustrated in FIG. 8(b), the AC current is applied across the first mirror part 31 and the second mirror part 32. By means of such control, too, as illustrated in FIG. 8(e), the influence of the leak current can be cancelled, and as a result, the level of the DC component C1 is kept constant. Therefore, by means of the second variation, too, similarly to the above embodiment, the inter-mirror distance of the Fabry-Perot interference filter 1 can be monitored and controlled with accuracy. Moreover, the AC current applied across the first mirror part 31 and the second mirror part 32 can be adjusted further suitably, and the inter-mirror distance can be controlled with more accuracy. For example, according to the second variation, the amplitude of the voltage Va can be adjusted to a desired value.

In the above embodiment, the current application unit 60 functions both as a DC current application unit which applies the DC current across the first mirror part 31 and the second mirror part 32 and as an AC current application unit which applies the AC current across the first mirror part 31 and the second mirror part 32, but the current application unit 60 may be used only as the AC current application unit. In this case, the optical filter system 100 may include constitution for applying the DC current across the first mirror part 31 and the second mirror part 32 separately from the current application unit 60. In the above embodiment, the control unit 80 functions both as the control unit which controls the AC current that the current application unit 60 applies across the first mirror part 31 and the second mirror part 32 and as a monitor unit which monitors the inter-mirror distance based on the AC component C2 detected by the voltage detection unit 70, but the optical filter system 100 may include constitution (a computer, for example) functioning as a monitor unit separately from the control unit 80. In the above embodiment, the first driving electrode 12 may not constitute the first mirror part 31. The first driving electrode may be a metal film disposed on the surface 22b of the first laminated body 22. Similarly, the second driving electrode 14 may not constitute the second mirror part 32. The second driving electrode may be a metal film disposed on a surface facing the surface 22b in the second laminated body 24. The DC current applied across the first mirror part 31 and the second mirror part 32 may have a non-zero (other than zero) DC component.

REFERENCE SIGNS LIST

100: optical filter system, 1: Fabry-Perot interference filter, 12: first driving electrode, 14: second driving electrode, 31: first mirror part, 32: second mirror part, 50: controller, 60: current application unit (current generating device), 61A, 61B: current source, 61C: current source for adjustment, 62A, 62B: photodiode, 63A, 63B: light source, 65: operational amplifier, 65a: inverting input terminal, 65b: non-inverting input terminal, 65c: output terminal, 70: voltage detection unit, 80: control unit (monitor unit), C1: DC current component, C2: AC current component, S: air gap

The invention claimed is:

1. A monitor device used with a Fabry-Perot interference filter having a pair of mirror parts facing each other with an air gap therebetween and a pair of driving electrodes facing each other with the air gap therebetween, and having a distance between the pair of mirror parts changed in accordance with charges stored between the pair of driving electrodes, the monitor device comprising:
    a current application unit that applies an AC current having a frequency higher than a resonant frequency of the pair of mirror parts across the pair of driving electrodes;
    a voltage detection unit that detects a temporal development of a voltage generated between the pair of driving electrodes during application of the AC current;
    a control unit that controls the AC current applied by the current application unit across the pair of driving electrodes, based on an evaluation of a DC component of the voltage detected by the voltage detection unit; and
    a monitor unit that monitors the distance between the pair of mirror parts based on an AC component of the voltage detected by the voltage detection unit.

2. The monitor device according to claim 1, wherein the control unit controls the AC current applied by the current application unit across the pair of driving electrodes, based on a temporal change of the DC component of the voltage detected by the voltage detection unit.

3. The monitor device according to claim 1, wherein the control unit controls the AC current applied by the current application unit across the pair of driving electrodes so that a level of the DC component of the voltage detected by the voltage detection unit is kept constant.

4. The monitor device according to claim 1, wherein the current application unit has a pair of current sources that apply currents with directions different from each other across the pair of driving electrodes, and generates the AC current by alternately driving the pair of current sources.

5. The monitor device according to claim 4, wherein the control unit changes a duty ratio of a pulse-shaped current generated by at least either one of the pair of current sources, based on the evaluation of the DC component of the voltage detected by the voltage detection unit.

6. The monitor device according to claim 4, wherein the control unit changes a level of the current generated by at least either one of the pair of current sources, based on the evaluation of the DC component of the voltage detected by the voltage detection unit.

7. The monitor device according to claim 4, wherein the current application unit further has a current source for adjustment that applies the current in the same direction as one of the pair of current sources across the pair of driving electrodes; and
    the control unit controls the current generated by the current source for adjustment, based on the evaluation of the DC component of the voltage detected by the voltage detection unit.

8. The monitor device according to claim 4, wherein each of the pair of current sources includes a photodiode and a light source that outputs light incident to the photodiode.

9. The monitor device according to claim 4, wherein the current application unit further has an operational amplifier having an inverting input terminal connected to an output terminal; and the pair of current sources are connected to a non-inverting input terminal and the output terminal of the operational amplifier in parallel.

10. The monitor device according to claim 1, wherein the control unit controls the AC current applied by the current application unit across the pair of driving electrodes, based on the DC component and the AC component of the voltage detected by the voltage detection unit.

11. An optical filter system, comprising:
the monitor device according to claim 1; and
the Fabry-Perot interference filter having a distance between the pair of mirror parts monitored by the monitor device.

12. A monitoring method for monitoring a distance between a pair of mirror parts in a Fabry-Perot interference filter having the pair of mirror parts facing each other with an air gap therebetween and a pair of driving electrodes facing each other with the air gap therebetween, and having the distance between the pair of mirror parts changed in accordance with charges stored between the pair of driving electrodes, the monitoring method comprising:
a voltage detection step of detecting a temporal development of a voltage generated between the pair of driving electrodes when an AC current having a frequency higher than a resonant frequency of the pair of mirror parts is applied across the pair of driving electrodes;
a control step of controlling the AC current applied across the pair of driving electrodes at the voltage detection step, based on an evaluation of a DC component of the voltage detected at the voltage detection step; and
a monitor step of monitoring a distance between the pair of mirror parts based on an AC component of the voltage detected at the voltage detection step.

13. A current generating device comprising:
an operational amplifier having an inverting input terminal connected to an output terminal;
a pair of photodiodes connected to a non-inverting input terminal and the output terminal of the operational amplifier in parallel in direction opposite to each other;
a pair of light sources each of which outputs light incident to the pair of photodiodes; and
a control unit configured to control the pair of light sources so that an AC current is generated by alternately driving the pair of light sources and by alternately driving the pair of photodiodes and a DC current is generated by driving either one of the pair of light sources and by driving either one of the pair of photodiodes.

* * * * *